(No Model.) 2 Sheets—Sheet 1.
J. COLLINS.
ART OF SPLICING CABLES.
No. 400,748. Patented Apr. 2, 1889.
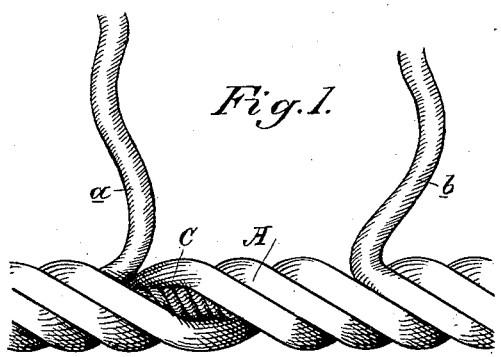
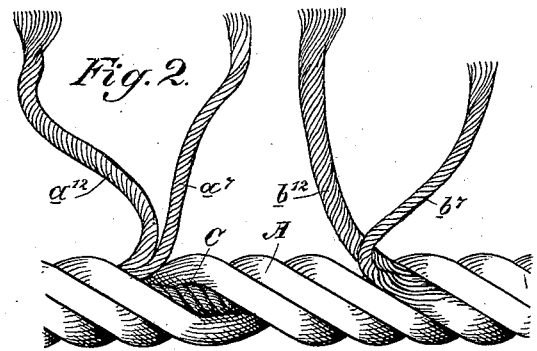
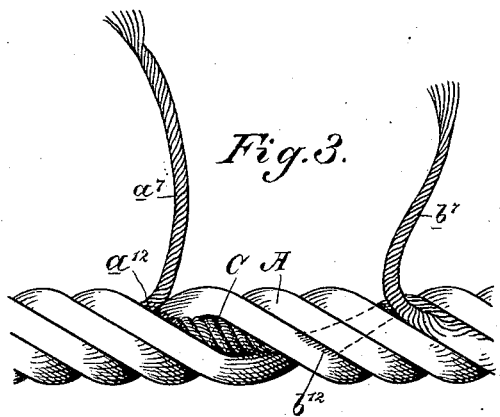
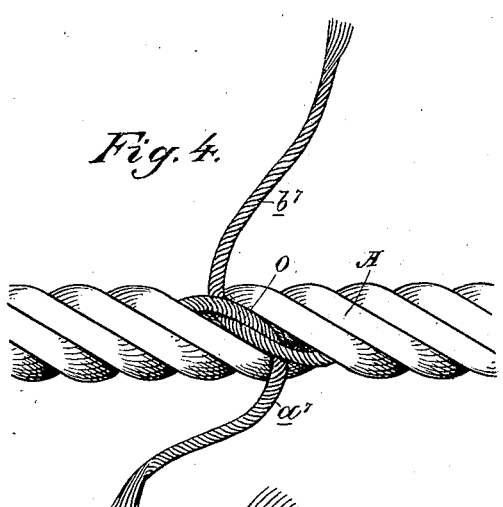
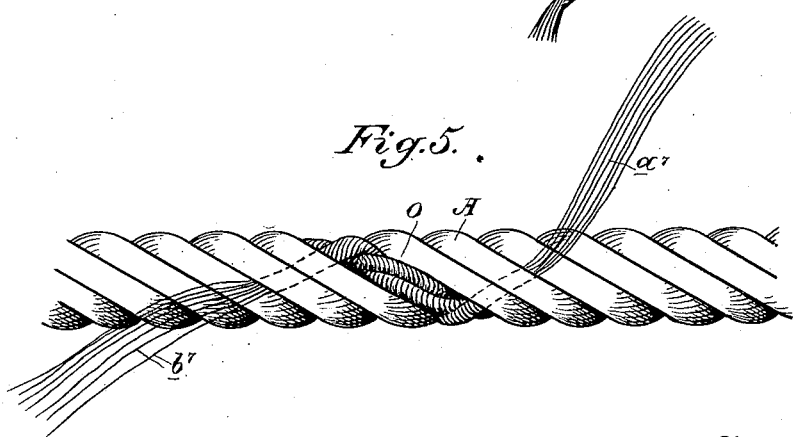
Witnesses,
Geo. H. Strong.
Inventor,
John Collins
By Dewey & Co.
Attys (No Model.) 2 Sheets—Sheet 2.
J. COLLINS.
ART OF SPLICING CABLES.

No. 400,748. Patented Apr. 2, 1889.

Witnesses,
Geo. H. Strong
J H Towne

Inventor
John Collins
By Dewey & Co.
attys

UNITED STATES PATENT OFFICE.

JOHN COLLINS, OF SAN FRANCISCO, CALIFORNIA, ASSIGNOR OF ONE-FOURTH TO H. H. LYNCH, OF SAME PLACE.

ART OF SPLICING CABLES.

SPECIFICATION forming part of Letters Patent No. 400,748, dated April 2, 1889.

Application filed December 15, 1888. Serial No. 293,731. (No model.)

*To all whom it may concern:*

Be it known that I, JOHN COLLINS, of the city and county of San Francisco, State of California, have invented an Improvement in the Art of Splicing Cables; and I hereby declare that the following is a full, clear, and exact description of the same.

My invention relates to the art of splicing cables, and particularly to that mode or method which, from the disposition of the strand ends or tucks, is known as "inlaid."

My invention consists in the following-described successive steps, to wit: Dividing the opposing strand ends or tucks back to their union with the cable; cutting off even with the surface of the cable one division of each tuck; taking one or more half-turns with the lay of the remaining divisions, one from each side, so as to form a splice-strand occupying the vacant score of the cable; unlaying the projecting ends of said last-named divisions so as to separate them into individual wires, and introducing said wires under the strands and against the soft core of the cable and laying them along and about said soft core throughout their length, all of which, together with details of the mode of operation, I shall hereinafter fully describe.

The object of my invention is to make an inlaid splice without having to remove or in any way interfere with the soft core of the cable, said splice being of an effective nature and specially adapted to be readily made.

Figure 6:
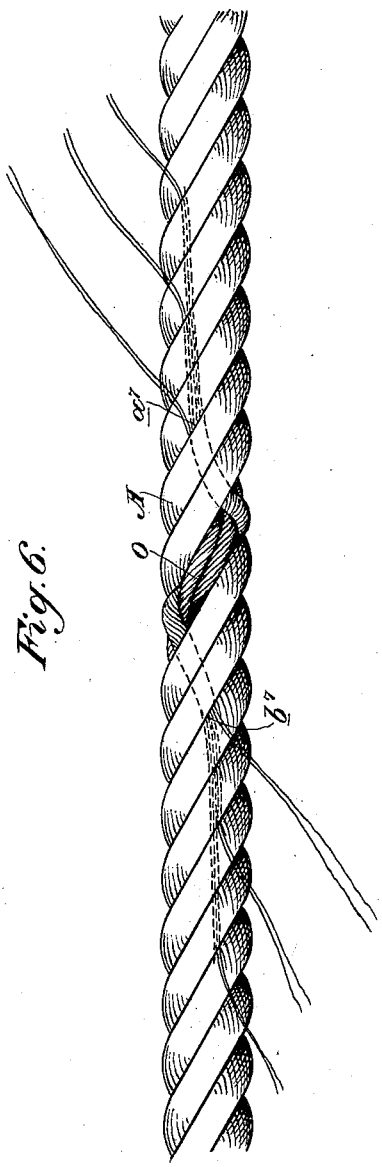
Figure 7:
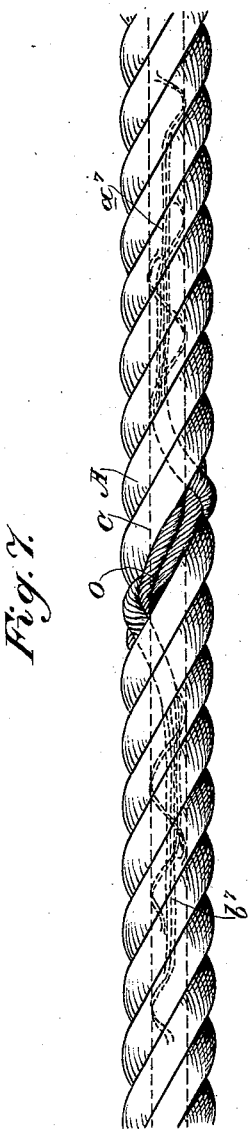

Referring to the accompanying drawings for a more complete explanation of my invention, Figure 1 is a view showing a short section of the cable and one pair of opposing strand ends or tucks. Fig. 2 is a view showing the division of the strand ends or tucks. Fig. 3 is a view showing the cutting off of one of the divisions on each side even with the surface of the cable. Fig. 4 is a view showing the laying up together of the remaining divisions to form a splice-strand occupying the vacant score of the cable. Fig. 5 is a view showing the projecting ends of the splice-strand divisions tucked under two adjacent strands and then unlaid into individual wires. Fig. 6 is a view showing said wires tucked, two, two and three under three successive pairs of strands, the third wire of the last set being cut off even with the surface of the cable. Fig. 7 shows all of said wires laid in, around, and against the soft core of the cable under successive pairs of strands.

It is not necessary for the purposes of the present application to illustrate or particularly describe the previous steps of the process of splicing, by which the cable is reduced to the condition shown in Fig. 1. These steps are well known, and it will be sufficient to state, generally, that the strands of the opposing ends of the cable being first unlaid are then interlocked, and alternate strands from each side are laid back to varying distances, followed by the opposing strands laid up in the scores thus formed, until, along the whole length of the general splice, the cable presents a number of opposing strand ends or tucks, one pair of which, as before stated, is shown in Fig. 1. It is with the proper disposition of these tucks or strand ends that my invention has to do, following generally in the lines of the inlaid splice, and particularly in that form of it in which the soft core of the cable is not removed; and my invention contemplates not only avoiding the removal of the soft core but also avoiding the disturbance of it in any manner, thus affording material increase in the speed of the splicing operation, and at the same time maintaining the efficiency of the work.

A is the cable. One of the strand ends or tucks is $a$ and the other is $b$. After the strand ends or tucks are brought up to oppose each other, as shown in Fig. 1, I divide each, as shown in Fig. 2, back to its point of union with the cable. As I have here shown the strand as composed of nineteen wires and have divided each strand end into divisions consisting of seven wires and twelve wires I will, for the sake of clearness, designate these divisions by $a^7$ $a^{12}$ $b^7$ $b^{12}$.

In a nineteen-wire strand there are seven inner or core wires surrounded by twelve outer wires. In making my divisions I prefer to observe this arrangement, so that in splicing the strand ends or tucks I form one division of the twelve outer wires and the other division of the seven core wires. This is shown in Fig. 2. My next step is to cut off the divisions $a^{12}$ and $b^{12}$ (which may or may not be first tucked under adjacent strands) even with the surface of the cable, as shown in Fig. 3, so that this much of each strand end or tuck is disposed of. I now bring together divisions $a^7$ and $b^7$, taking one or more turns with the lay—that is to say, twisting them together so that each shall occupy the score left vacant by the untwisting of the wires which had previously occupied said score—thus forming a splice-strand which I designate by the letter O, and which occupies the vacant score of the cable, as shown in Fig. 4, the ends still projecting. My next step is to tuck these projecting ends under adjacent strands of the cable, and then to unlay or separate said ends into individual wires, all as shown in Fig. 5. Then I lay in all these individual wires into the cable against and around the soft core C thereof. As these divisions $a^7$ and $b^7$ are unlaid their separated wires find independent seats in the soft core and embed themselves separately in its exterior surface, thus being spread out and avoiding the undue prominence in the cable, which would be the result on inlaying the whole division in a laid-up condition. In thus introducing the individual wires of the unlaid divisions $a^7$ and $b^7$ of the trucks $a$ and $b$ into the cable I may lay them in continuously under the adjacent pair of strands; but I prefer the following method: Referring to Fig. 6, it will be seen that I separate the seven wires of $a^7$ and $b^7$, leaving two of each tucked under the pair of strands adjacent to the splice-strand, bringing two more out under the succeeding pair of strands, and the remaining three under the next succeeding pair of strands, and one of these three I cut off even with the surface of the cable, as shown in Fig. 6. Then with my needle I lay each pair of wires under the adjacent pair of strands and carry them along against and about the soft core C up to their ends. This is shown in Fig. 7. There is a distinct advantage in this mode, in that whereas where the wires are laid in under a single pair of strands throughout they only get the nip of said strands, yet when they are tucked in and laid under succeeding pairs they get the nip of all the strands of the cable and hold better, and there is the further advantage of dividing up the tucks, so that in laying them in they will not make a bulge in the cable, nor to the least appreciable extent affect its diameter. This form of splice affords all necessary security, and has the additional advantage that it can be rapidly made, because the soft core need not be removed nor manipulated in any manner, and by laying the tucks in flat or in separated wires, as described, the diameter of the cable is not appreciably increased, if, in fact, it be increased at all, for each wire embeds itself in the soft core and does not project beyond its periphery.

Having thus described my invention, what I claim as new, and desire to secure by Letters Patent, is—

1. In the art of splicing cables, the method of treating and disposing of the strand ends or tucks, which consists in dividing them back to their union with the cable, cutting off even with the surface of the cable one of the divisions of each tuck, laying up the remaining divisions so as to form a splice-strand occupying the vacant score of the cable, unlaying the projecting ends of said last-named divisions into individual wires, and finally laying said unlaid ends in a flattened condition into the cable under the strands and against the soft core of the cable, substantially as described.

2. In the art of splicing cables, the method of treating and disposing of the strand ends or tucks, which consists in dividing them back to their union with the cable, cutting off even with the surface of the cable one of the divisions of each tuck, laying up the remaining divisions so as to form a splice-strand occupying the vacant score of the cable, tucking said divisions under adjacent strands, unlaying their projecting ends back to said strands into individual wires, and finally laying said unlaid ends in a flattened condition into the cable under the strands and against the soft core of the cable, substantially as described.

3. In the art of splicing cables, the method of treating and disposing of the strand ends or tucks, which consists in dividing them back to their union with the cable, cutting off even with the surface of the cable one of the divisions of each tuck, laying up the remaining divisions so as to form a splice-strand occupying the vacant score of the cable, unlaying the ends of said last-named divisions into individual wires, and finally tucking and laying under different strands of the cable the different wires of the said divisions and carrying them around and against the soft core of the cable, whereby said wires are nipped by all the strands of the cable, substantially as described.

4. In the art of splicing cables, the method of treating and disposing of the strand ends or tucks, which consists in dividing them back to their union with the cable, cutting off even with the surface of the cable one of the divisions of each tuck, laying up the remaining divisions so as to form a splice-strand occupying the vacant score of the cable, tucking said divisions under adjacent strands of the cable, unlaying the projecting ends of said last-named divisions into individual wires, tucking different ones of said wires under succeeding strands, and finally laying in all of said wires under different strands of the cable against and around the soft core thereof, whereby said wires are nipped by all the strands of the cable, substantially as described.

In witness whereof I have hereunto set my hand.

JOHN COLLINS.

Witnesses:
S. H. NOURSE,
H. C. LEE.